(12) United States Patent
Minto et al.

(10) Patent No.: US 9,383,462 B2
(45) Date of Patent: Jul. 5, 2016

(54) SEISMIC DEVICE WITH SEALED HOUSING AND RELATED METHODS

(75) Inventors: James Minto, Houston, TX (US);
Robert Lanza, Los Gatos, CA (US);
Bradley Bryans, Houston, TX (US);
Leo M. Dekkers, Houston, TX (US);
Shantonu Ray, Houston, TX (US)

(73) Assignee: SCHLUMBERGER TECHNOLOGY CORPORATION, Sugar Land, TX (US)

(*) Notice: Subject to any disclaimer, the term of this patent is extended or adjusted under 35 U.S.C. 154(b) by 102 days.

(21) Appl. No.: 14/127,114

(22) PCT Filed: Jun. 18, 2012

(86) PCT No.: PCT/US2012/042929
§ 371 (c)(1),
(2), (4) Date: Jul. 10, 2014

(87) PCT Pub. No.: WO2012/174520
PCT Pub. Date: Dec. 20, 2012

(65) Prior Publication Data
US 2014/0328139 A1 Nov. 6, 2014

Related U.S. Application Data

(60) Provisional application No. 61/498,362, filed on Jun. 17, 2011.

(51) Int. Cl.
*G01V 1/04* (2006.01)
*G01V 1/02* (2006.01)
(Continued)

(52) U.S. Cl.
CPC .. *G01V 1/04* (2013.01); *G01V 1/02* (2013.01);
*G01V 1/143* (2013.01); *G01V 1/52* (2013.01);
*G01V 11/005* (2013.01); *G01V 1/40* (2013.01)

(58) Field of Classification Search
CPC ............ G01V 1/02; G01V 1/04; G01V 1/40;
G01V 1/52; G01V 1/143; G01V 11/005
USPC ............................................................ 367/25
See application file for complete search history.

(56) References Cited

U.S. PATENT DOCUMENTS 4,700,803 A   10/1987   Mallett et al.
4,715,470 A   12/1987   Paulsson
(Continued)

OTHER PUBLICATIONS

International Search Report for PCT Application Serial No. PCT/US2012/042929 dated Jan. 30, 2013.
(Continued)

*Primary Examiner* — Daniel L Murphy
(74) *Attorney, Agent, or Firm* — Michael Dae

(57) ABSTRACT

A seismic generation system may include an electrical source, a conductor coupled to the electrical source and to be positioned in a wellbore in a subterranean formation with a casing therein, and a seismic generation source assembly to be positioned in the wellbore and coupled to the conductor. The seismic generation source assembly may include a source element having a sealed housing, an armature within the sealed housing, source electromagnets coupled to the armature, and electromagnetic clamps coupled to the armature, each electromagnetic clamp having opposite magnetic poles. The sealed housing may include respective ferromagnetic portions adjacent the opposite magnetic poles of each electromagnetic clamp, and non-ferromagnetic portions between the opposite magnetic poles of each electromagnetic clamp.

28 Claims, 15 Drawing Sheets

(51) Int. Cl.
    *G01V 1/143*    (2006.01)
    *G01V 1/52*     (2006.01)
    *G01V 11/00*    (2006.01)
    *G01V 1/40*     (2006.01)

(56) References Cited

U.S. PATENT DOCUMENTS

| | | |
|---|---|---|
| 4,953,136 A | 8/1990 | Kamata et al. |
| 5,041,806 A | 8/1991 | Enderle et al. |
| 7,145,834 B1 | 12/2006 | Jeter |
| 7,441,628 B2 | 10/2008 | Minto |
| 7,916,578 B2 | 3/2011 | Minto et al. |
| 2003/0179651 A1 | 9/2003 | Nutt et al. |
| 2007/0211572 A1 | 9/2007 | Reiderman et al. |
| 2009/0283355 A1 | 11/2009 | Minto et al. |
| 2009/0308617 A1 | 12/2009 | Minto |

OTHER PUBLICATIONS

Communication pursuant to Article 94(3) issued in EP Application No. 12800245.8 on Sep. 1, 2015.
Supplementary European Search Report issued in EP Application No. 12800245.8 on Aug. 10, 2015.

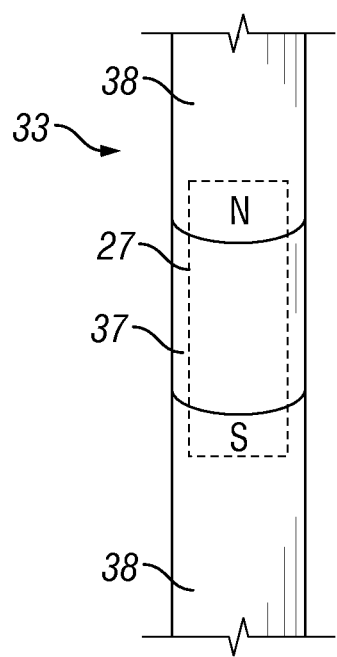 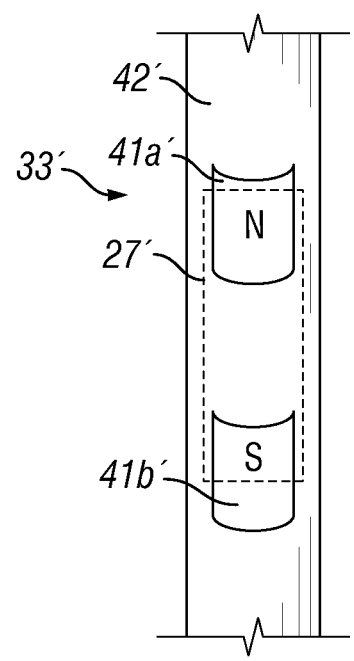
FIG. 3A  FIG. 3B

SEISMIC DEVICE WITH SEALED HOUSING AND RELATED METHODS

BACKGROUND

It is often desirable to obtain information about a subterranean formation in the Earth surrounding a well. The information may be used, for example, to target areas within the subterranean formation most likely to produce oil and/or gas, thereby improving well production and reducing operating costs. One way to obtain information about the formation in the earth surrounding a well is to use a source to generate seismic waves that pass through the geologic formations adjacent to the wellbore, and a receiver that receives at least a portion of the seismic energy.

Transmission factors evidenced by the amount of time it takes the signal to travel from the source to the receiver, and/or the amplitude or phase of the received signal compared to that of the transmitted signal, are generally indicative of formations surrounding the wellbore. These investigatory techniques are generally called "seismic" techniques.

In some approaches, the seismic waves are generated by a seismic generation device inserted in the wellbore. The seismic generation device is driven by an electrical source, perhaps located on the surface. Given the length of the wellbore, the user of the seismic generation device may not know the exact orientation of the seismic generation device within the wellbore, which can increase the computational load of deriving details of the subterranean formation at the receiver.

SUMMARY

A seismic generation system may include an electrical source, a conductor coupled to the electrical source and to be positioned in a wellbore in a subterranean formation with a casing therein, and a seismic generation source assembly to be positioned in the wellbore and coupled to the conductor. The seismic generation source assembly may include a source element having a sealed housing, an armature within the sealed housing, source electromagnets coupled to the armature, and electromagnetic clamps coupled to the armature, each electromagnetic clamp having opposite magnetic poles. The sealed housing may include respective ferromagnetic portions adjacent the opposite magnetic poles of each electromagnetic clamp, and non-ferromagnetic portions between the opposite magnetic poles of each electromagnetic clamp.

This summary is provided to introduce a selection of concepts that are further described below in the detailed description. This summary is not intended to identify key or essential features of the claimed subject matter, nor is it intended to be used as an aid in limiting the scope of the claimed subject matter.

BRIEF DESCRIPTION OF THE DRAWINGS

FIGS. 3A-3B are partial side views of embodiments of the sealed housing from the seismic generation system of FIG. 1.

DETAILED DESCRIPTION

The present description is made with reference to the accompanying drawings, in which embodiments are shown. However, many different embodiments may be used, and thus the description should not be construed as limited to the embodiments set forth herein. Rather, these embodiments are provided so that this disclosure will be thorough and complete. Like numbers refer to like elements throughout, and prime notation is used to indicate similar elements or steps in alternative embodiments.

Figure 1:
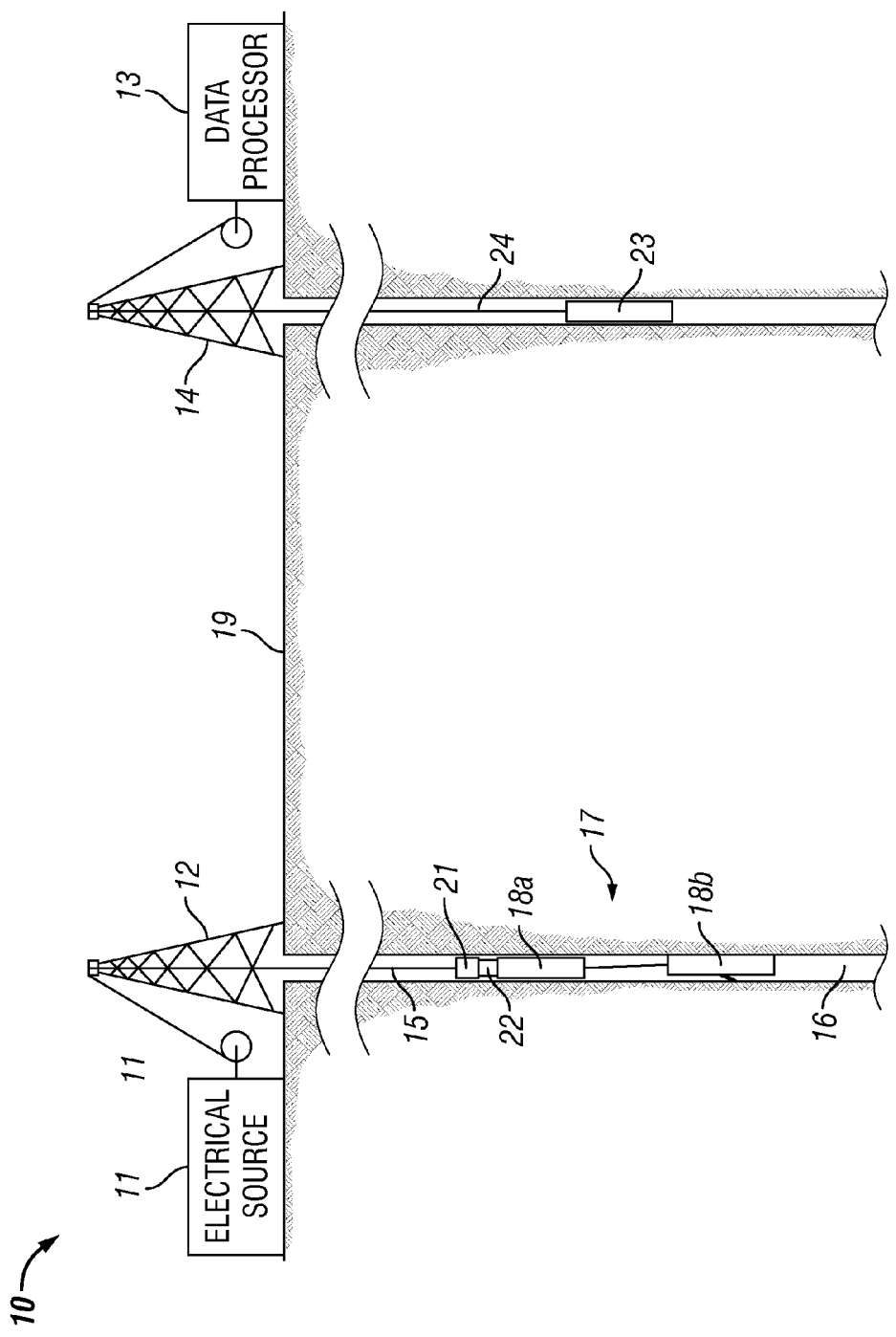
FIG. 1 is a schematic diagram of a seismic generation system, according to the present disclosure.
Figure 2:
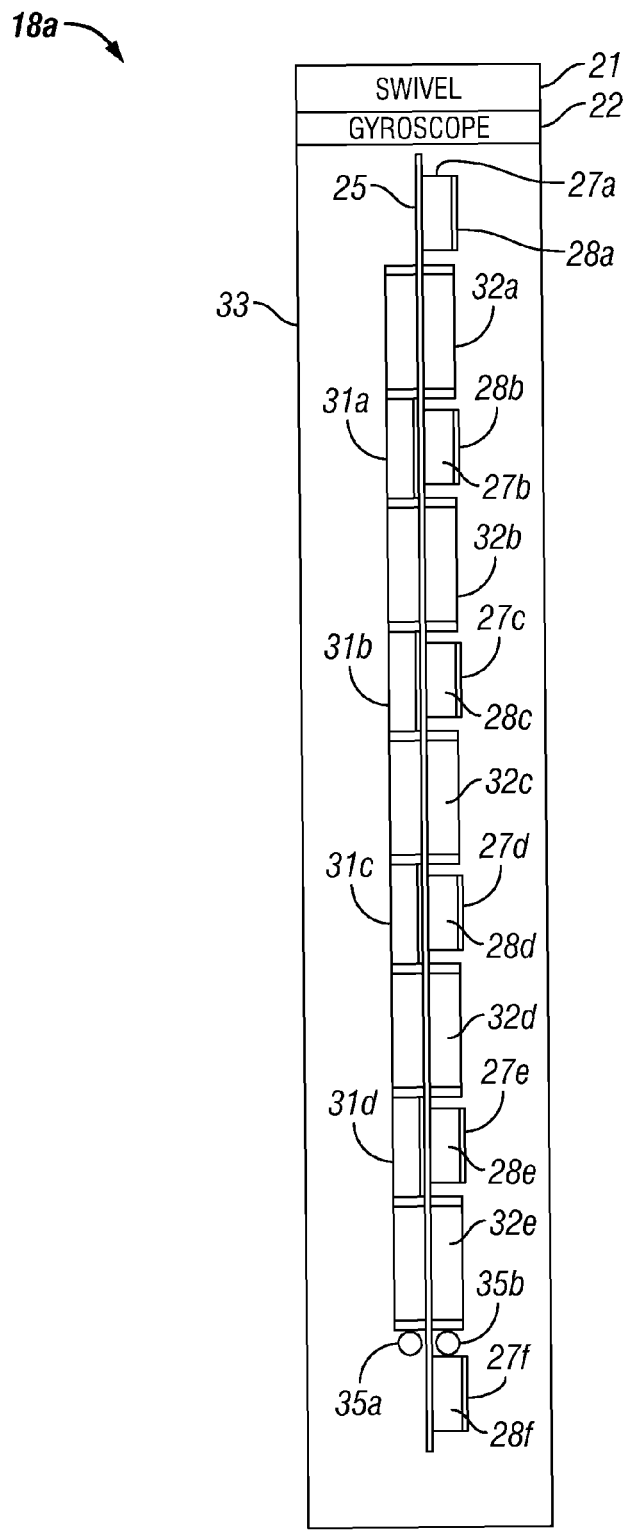
FIG. 2 is a schematic diagram of the source element from the seismic generation system of FIG. 1.

Referring initially to FIGS. 1-2, a seismic generation system 10 according to the present disclosure is now described. The seismic generation system 10 illustratively includes an electrical source 11, a conductor 15 coupled to the electrical source and to be positioned in a wellbore 16 in a subterranean formation 19 with a casing therein, and a support structure 12 for controlling the extension/retraction of the conductor into the wellbore. The seismic generation system 10 illustratively includes a seismic generation source assembly 17 to be positioned in the wellbore 16 and coupled to the conductor 15. The seismic generation source assembly 17 illustratively includes a plurality of source elements 18a-18b.

In FIG. 2, the upper source element 18a is shown in detail, but it should be appreciated that the lower source element 18b includes similar components. The source element 18a illustratively includes a sealed housing 33, an armature 25 within the sealed housing, a plurality of source electromagnets 32a-32e coupled to the armature, and a plurality of electromagnetic clamps 27a-27f coupled to the armature. For example, the sealed housing 33 may comprise a cylindrical housing. Each electromagnetic clamp 27a-27f and source electromagnet 32a-32e illustratively includes opposite magnetic poles. Each electromagnetic clamp 27a-27f illustratively includes a footer 28a-28f for placement against an interior surface of the casing of the wellbore 16. Indeed, in some embodiments, the footers 28a-28f each has a curved surface.

The source element 18a illustratively includes a plurality of supplemental masses 31a-31d positioned between adjacent source electromagnets 32a-32e. The supplemental masses 31a-31d add extra weight and mass to the source element 18a. The source element 18a also illustratively includes a pair of roller bearings 35a-35b coupled to a lower portion of the armature 25, which support the weight of the supplemental masses 31a-31d, the electromagnetic clamps 27a-27f, and the source electromagnets 32a-32e. The seismic generation source assembly 17 illustratively includes a swiveling coupler 21 between the upper source element 18a and the conductor 15. For example, the conductor 15 may comprise a metallic cable.

The generation source assembly 17 is inserted into the wellbore 16 and the upper source element 18a is activated. The activation process includes first activating the electromagnetic clamps 27a-27f, attaching the upper source element 18a to the casing of the wellbore 16 via a magnetic clamp. The process also includes activating the source electromagnets 32a-32e, which have a magnetic force less than that of the electromagnetic clamps 27a-27f (maintaining the clamp of the casing), for acting on the armature 25, causing it to bow and warp. The motions of the armature 25 are then communicated through the electromagnetic clamps 27a-27f to the casing in the wellbore 16 to transmit seismic waves. The source electromagnets 32a-32e are then deactivated, and the electromagnetic clamps 27a-27f are then also deactivated, thereby releasing the upper source element 18a from the casing of the wellbore 16.

The conductor 15 is then retracted a distance to elevate the lower source element 18b to be at the same depth as the upper source element 18a when it was activated. The source electromagnets 32a-32e of the lower source element 18b are oriented to be rotated 90 degrees relative to the source electromagnets in the upper source element 18a. The lower source element 18b is then also activated, much the same way as the upper source element 18a. The seismic waves are transmitted through the subterranean formation 19. The seismic generation system 10 illustratively includes a receiver 23 lowered into another wellbore, a receive conductor 24 coupled to the receiver and extending to the surface, a support structure 14 for controlling extension/retraction of the receive conductor, and a data processor 13 processing the data received at the receiver.

In some subterranean seismic generation approaches, the generation source assembly 17 may inadvertently rotate around due to the twisting forces on the conductor 15, which can effect the results of the seismic imaging. The swiveling coupler 21 prevents the generation source assembly 17 from spinning and changing the orientation of the source electromagnets 32a-32e in the upper and lower source elements 18a-18b. This makes the relative orientation of the first and second source electromagnets 32a-32e known to the data processor 13, which reduces computational load and enhances the accuracy of the imaging of the subterranean formation 19.

In the illustrated embodiment, the seismic generation source assembly 17 illustratively includes a gyroscope 22 to provide positional data of the source elements 18a-18b. In particular, the gyroscope 22 may be installed below the swiveling coupler 21, and the positional data therefrom is forwarded to the data processor 13, which also reduces computational load and enhances accuracy of the imaging of the subterranean formation 19.

The sealed housing 33 of the source elements 18a-18b shields the components therein from the pressurized fluids sometimes found in the wellbore 16. Nevertheless, although the source electromagnets 32a-32e act internally on the armature 25, the electromagnetic clamps 27a-27f extend their force through the sealed housing 33 and act on the casing of the wellbore 16. A thick and mechanically robust housing protects the internal equipment of the source elements 18a-18b, but may render the electromagnetic clamps 27a-27f ineffective.

Referring now additionally to FIGS. 3A-3B, the sealed housing 33 includes respective ferromagnetic portions adjacent the opposite magnetic poles of each electromagnetic clamp 27a-27f, and non-ferromagnetic portions between the opposite magnetic poles of each electromagnetic clamp. In one embodiment (FIG. 3A), the sealed housing 33 is formed from a ferromagnetic material, such as steel, and each non-ferromagnetic portion comprises a non-ferromagnetic ring (insert, illustratively shown as a ring) 37 between the opposite magnetic poles of each electromagnetic clamp 28. In other words, there is a non-ferromagnetic ring 37 between the poles of each of the electromagnetic clamp 27a-27f. The non-ferromagnetic ring 37 may be welded into the sealed housing 33 and prevents the ferromagnetic sealed housing from shorting out the electromagnetic clamps 27a-27f. In other embodiments, the non-ferromagnetic insert 37 may comprise strips welded into the sealed housing 13.

In another embodiment, the sealed housing 33' is formed from a non-ferromagnetic material. In this embodiment, each ferromagnetic portion comprises a ferromagnetic patch portion 41a'-41b' surrounded by the non-ferromagnetic portions 42'.

In some embodiments, the conductor 15 comprises a single conductor (FIG. 1), and the upper source element 18a comprises a controller (56 FIG. 5) coupled to the single conductor to selectively operate the pluralities of electromagnetic clamps, and source electromagnets. In other embodiments, the conductor comprises a plurality thereof comprising a plurality of drive conductors, and a plurality of return conductors.

A method for operating a seismic generation system 10 in a wellbore 16 in a subterranean formation 19 with a casing therein. The method comprises coupling at least one conductor 15 to an electrical source 11, positioning in the wellbore a seismic generation source assembly 17 comprising at least one source element 18a-18b. The at least one source element 18a-18b includes a sealed housing 33, an armature 25 within the sealed housing, a plurality of source electromagnets 32a-32e coupled to the armature, and a plurality of electromagnetic clamps 27a-27f coupled to the armature, each electromagnetic clamp having opposite magnetic poles. The sealed housing 33 comprises respective ferromagnetic portions adjacent the opposite magnetic poles of each electromagnetic clamp 27a-27f, and non-ferromagnetic portions between the opposite magnetic poles of each electromagnetic clamp. The method also includes activating at least one of the plurality of source electromagnets 32a-32e and the plurality of electromagnetic clamps 27a-27f.

Seismic energy traveling through the Earth and recorded underground or on the surface can provide much information about the geology of the subsurface. Many different devices are used on the surface to generate seismic energy and a few are able to travel down into the earth on various conveyance means in holes drilled for the production or exploration of oil, gas and other minerals. There are many advantages in placing the seismic source and receivers as close as possible to the target geological formations that are being imaged. This includes much higher resolution images because the seismic energy can contain higher frequencies having travelled less through attenuated formations like the near surface. For this reason, downhole seismic sources, although limited in design by the size and shape of wellbores play a crucial role in understanding the subsurface. It is advantageous if these sources are powerful, broadband, repeatable and resistant to harsh conditions found underground.

Measure and Balance Air Gap

By measuring the air gap and applying a DC current to the appropriate electromagnet, the air gap can be equalized on both sides of the armature hence allowing operation in deviated holes. The airgap can be measured directly by installing a secondary device which changes capacitance, resistance or inductance as the air gap changes. Alternatively the air gap can be inferred from information contained in the driving voltage and current. Other Options for measuring the airgap include: noncontact optical interferometry As the tool lays over in a deviated well, the reduced airgap on the high side can be adjusted by applying DC current to the low side magnets until the air gap on both sides is equal. Equalizing the airgap may increase the displacement of the reaction mass and hence maximize output. If the airgap is measured and controlled at many frequencies then any resonances can be compensated for and the frequency response flattened. By sensing and controlling the airgap magnetically, the function of the springs used in the present configuration to balance the airgap is reduced.

Measure and Feedback Acceleration, Velocity or Displacement

By measuring the acceleration, velocity or displacement of both the armature bar and the reaction mass, the source performance can be monitored and the information transmitted back to the surface. These measurements can indicate what energy went into the casing and hence the formation and this can be processed with the received information in other wells or at the surface to improve the quality of the received data.

These measurements can also be used to determine the quality of clamp to the casing and if the clamp is less than optimum. The armature bar displacement, velocity or acceleration should be very small as long as the tool is clamped to the casing. Larger values of displacement, velocity or acceleration would indicate poor clamping or poor coupling between the casing and the formation, for example, bad cement. Frequency analysis of the measured velocity or accelerometer data would detect if the source was overdriven to the point that the drive magnet contacts the armature bar. This could result in automatic reduction in drive current to reduce contact or increasing the drive current to maximize output without contacting the armature bar at most frequencies.

Housing as Armature

Because the armature bar is flat, the reaction mass moves linearly producing P-wave energy in the direction of movement and SH perpendicular to the P wave. If the P-Wave direction is towards a receiver then the P wave energy will be received—no SH will be received. If the SH direction is towards a receiver, then the SH will be received and No P-Wave will be detected. To ensure that both P-wave and SH wavefields are recorded, then two axis are arranged oriented 90 degrees apart. One axis is activated then the source is moved up so the lower axis occupies the same depth as the first axis and then the second axis is activated. The data from the two axis is combined in processing to produce the full wavefield at most depths. This process takes time and may need the source to not rotate as it moves up the wellbore.

Figure 4:
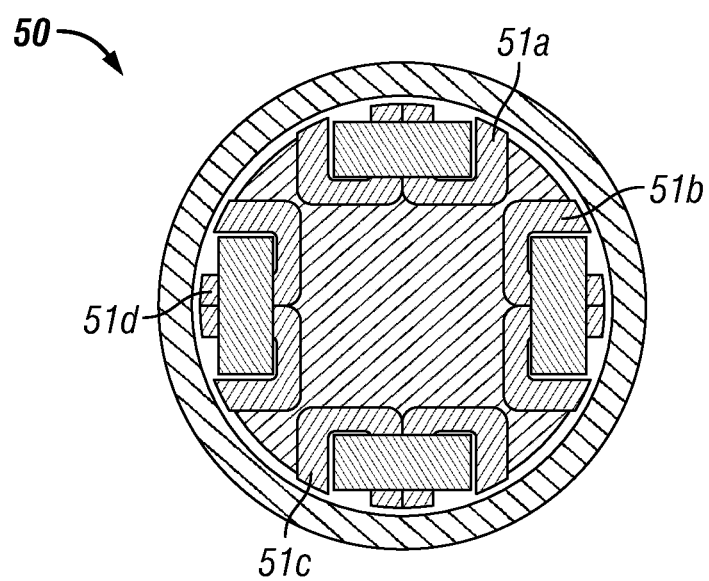
FIG. 4 is a schematic diagram of another embodiment of the source element, according to the present disclosure.

A cylindrical housing is already utilized to protect the actuators and clamps from wellbore fluids. Referring now to FIG. 4, this embodiment 50 uses the cylindrical housing as the armature, eliminating the flat bar and allowing electromagnets 51a-51d on the circumference of the reaction mass to act on the inside of the cylindrical housing in much the same way that the electromagnets hereinabove act on the casing.

By measuring the orientation of the source with respect to North using readily available gyro tools, the source could be activated first with P-wave directed at a known receiver and then with SH directed towards receivers. Alternatively, the orientation may not be measured and the received data processed as before to yield P and SH information. The advantage now is that with one axis, rotation between levels is no longer an issue.

Variable Air Gap

The magnetic attractive force between the armature bar and the reaction mass tries to accelerate the reaction mass towards the armature bar. For a given electrical power, force between the electromagnet and armature bar is inversely proportional to the cube of the air gap therefore, small air gaps allow much higher forces than larger air gaps for the same drive power. At low frequencies it is desirable to have a larger air gap so the reaction mass has time to accelerate towards the armature during the first half cycle then accelerate in the other direction during the second half cycle. At high frequencies the reaction mass has much less time to accelerate and therefore travels much less distance allowing for smaller air gaps and reduced power requirements. Therefore a variable air gap—small at high frequencies and large at low frequencies is desirable for increasing efficiency of electrical power usage. A variable air gap can be achieved by various mechanical means including sliding wedges, cams and screws.

Swivel

Normal conveyance methods for a borehole seismic source includes double armor wound multi or single conductor wirelines. As these wirelines are lowered into or retrieved from a wellbore they tend to spin because of residual torque from the manufacturing process. When the two axes vibrator is moved uphole so that the lower axis occupies the depth location previously occupied by the upper axis, any spin of the tool while moving changes the relative orientation from the known 90 degrees to an unknown value. To reduce the spin, a rotating electrical connection (swivel) can be installed between the wireline and the upper vibrator axis. The addition of the rotating connection prevents the torque that is inherently present in the cable from being transmitted to the vibrator. Without the cable torque, the vibrator moves uphole without spinning and hence maintains 90 degree orientation between the two axes.

Centralized or Decentralized Tool

Clamping a dual axis tool to the inside of steel casing, such that 90 degree relative orientation of the two axes is maintained, can be done in two ways. In the first method, the two axes remain centralized in the casing regardless of casing diameter. This is accomplished by attaching different length extensions to the magnetic clamp poles. The advantages of this method include increased surface contact between casing and clamp pole because the clamp extensions can be made wider at the ends contacting the casing and coupling between the axis is simplified because angular offset is desired—not axial offset. A potential drawback of this method is the increased diameter of tool is unsuitable for deployment through narrow restrictions into larger diameter casings.

In the second method, the clamp poles are located directly on the vibrator housing such that the outside diameter of the vibrator is minimized. The two axis can then be coupled together using flexible (knuckle) joints located between the two axis and arranged to maintain 90 degree relative orientation and with enough flexibility to allow both axis to contact casing with inside diameters larger than the outside diameter of the vibrator. An additional decentralizing device is also desired to effect axial displacement and push the two axes towards the casing where the magnetic clamps can then make contact and transfer force to the casing.

Orientation Measurement

Knowing the orientation of the vibrator in any form would improve data analysis. This could be achieved in a cased borehole by combining the seismic vibrator with a gyro tool, which uses the acceleration due to the earth's rotation to determine tool orientation relative to North. The vibrator could also be combined with a tool which measures inclination and this information combined with known wellbore trajectory would yield orientation in deviated wellbores.

Multi-Module Length as per Upper Frequency

The vibrator includes two parts. A moving part or reaction mass and a part clamped firmly to the wellbore casing. In the design disclosed herein, each reaction mass acts on two clamps—one on either side of the reaction mass. This can be referred to as a module. Multiple modules can be deployed together and driven and clamped together to increase seismic output. Modules can have n reaction masses with n+1 clamps. By including a connector or field joint at each end of each module, modules can be combined to provide any source length used to provide suitable output within the constraints imposed by the upper frequency and length limitation to maintain a point source.

Beam Steering

With the multiple module configurations, the modules could be driven with the same drive current at the same time or each module could be driven with the same current but out of phase with other modules. In other words, beam steering can be used to alter the radiation pattern of, in this case, the borehole vibrator.

Magnetic Clamping Through Housing

Extending a magnetic clamp from an armature that may be in air or some other gas to a casing that may be in fluid can be accomplished using various ways. Some approaches would involve flexible seals between the magnet poles and a housing around the armature and reaction mass. Flexible seals ("O" rings) constructed of an elastomer may need maintenance and can be prone to failure due to temperature, pressure and corrosive fluids. Elastomeric seals can be removed by welding in magnetic pieces to a non-magnetic housing or alternatively, welding non-magnetic pieces into a magnetic housing. Although either method works, the best solution depends on material strengths and the thickness and pressure ratings.

In the case where magnetic pieces are welded into a non-magnetic housing, the pieces of magnetic material are positioned so that the internal magnetic poles coincide with the magnetic pieces. Suitable attachments for conforming to casing radius are attached to the outside of the magnetic pieces.

In the case of non-magnetic pieces being welded into magnetic housings, then the non-magnetic pieces would coincide with the area between the magnet poles, hence preventing the flux paths of the clamp magnets from shorting out on the casing.

Mechanical Clamps for Non-Magnetic Casing

Magnetic clamps, although ideal for the appropriate casing with good magnetic properties, do not perform in plastic or other non-magnetic casing such as some varieties of stainless steel. To overcome this limitation, an alternate means of clamping may include hydraulic pistons, motor driven screws or cams. This would also allow use in open hole.

Drive with Square Waves

When the driving voltage is positive, current is steered to one side of the driver assembly by a diode. Another diode conducts current to the opposite side when the drive voltage is negative. The drive voltage waveform is normally sinusoidal but in certain circumstances would benefit from being a square wave. Any circuit which controlled the flow of current to the driver coils is much simplified if a square wave can be applied because the controller can be a simple switch which is either "off" with a high electrical resistance or "on" with a low electrical resistance. Avoiding the situation where a switch is ½ on simplifies design and lowers power loss and heat dissipation in the switching device.

Rather than controlling the amplitude of the driven current, the system can be operated by varying the ratio of time on to time off for the switches. This is known as Pulse Width modulation and operates switches in the "ON" or "off" condition. The borehole vibrator would benefit from this arrangement if the controlling circuits were located downhole with the vibrator rather than on the surface at the other end of a long wireline cable. Having the controlling circuits next to the vibrator allows DC voltage to be applied to the wireline eliminating losses due to the cable capacitance.

High Frequency by Putting Ceramic Between Armature and the Clamp

The force generated between the driver and the armature is dependent on the current flowing through the electromagnet coils. Because the coils are inductors, for constant voltage, the current drops as frequency rises. Within limits, the voltage can be increased as frequency rises to compensate for the increased impedance with frequency, however a practical limit is reached where the breakdown voltage of the various components is exceeded and the voltage cannot be raised farther. As frequency is increased, the current falls and force and output falls. This is a fundamental limitation of an inductive device.

Another method of affecting mechanical motion with applied voltage is to use piezo ceramic material. This material changes dimension with applied voltage and comprises a capacitive device. This means that impedance reduces as frequency increases. This embodiment combines ceramic material into the vibrator structure so that when the force out reduces from the electromagnets the force out increases from piezo electric material placed between the armature and the clamp magnets.

With piezo electric material sandwiched between the armature bar and the clamp magnets, an AC voltage applied to the ceramic will cause the ceramic material to expand or contract (Depending on polarity of applied voltage) pushing or pulling the reaction mass to or from the armature bar in the same way as the electromagnets.

Air Gap Pressurized to Increase Pressure Rating of Tool

The source output is dependent on the mass of the reaction mass. The higher the mass, the higher the output. To maximize the reaction mass, it is desirable to have a thin walled housing to increase internal volume available for reaction mass. Unfortunately the pressure rating of the housing is lessened if the walls are thin so the device would be unable to operate in deeper wells. To compensate for this, a thin walled housing could be pressurized internally with air or some other gas (for example, an inert gas such as Nitrogen or Helium).

Single Conductor Operation

The basic vibrator module may use a drive voltage (AC, 1000V rms, 3 amps, 30 and 800 Hz) and clamp current—DC 1 amp. In a two axis device, the conductors used could be as follows:

| Conductor # | Usage |
| --- | --- |
| 1 | Drive X |
| 2 | Drive Y |
| 3 | Return X and Y |
| 4 | Clamp X +ve and Clamp Y −ve |

It is desirable to run on a single conductor wireline rather than multi-conductor because single conductor equipment is much cheaper and more readily available. This embodiment relates to an electronic circuit which allows many of the functions for a dual axis vibrator to be applied over a single conductor wireline.

Z-Trac Monoconductor Wireline Adaptor Module (WAM) Overview

The Z-Seis electrodynamic vibrator module system (Z-Trac) currently operates on 7-conductor wireline. An interface mechanism is disclosed herein, such that 4 Z-Trac vibrator operate with monoconductor and 7-conductor wireline.

Target Specifications

Minimal impact on existing surface electronics and software. The following vibrator parameters controlled from surface computer:

Clamp force.

Vibrator magnitude and frequency.

X or Y-axis selection.

Utilization of wireline similar to Camesa ⅜" monoconductor 1N38.

Operational wireline length: 0 to ≥20K feet.

Target operating temperature range: approaching 200° C.

Mechanical: diameter consistent with current Z-Trac modules. (Module I.D.≤3.285 inches.)

Continuous operation.

Support existing Z-Trac module parameters as follows:

Number of modules: 4 total, (2 x-axis, 2 y-axis).

X and y axis module operation is orthogonal (not at the same time).

Axis clamp current: 1.1 Amps/module maximum
@ (17Ω+96 mH)/coil, (4 coils in series/module).

Vibrator coil excitation current: 3 Amps peak/module maximum.
@ 88 mH to 110 mH)/coil, 3 coils in parallel/module, 6 coils total/module.

Vibrator coils operate in a push-pull non-linear DC motor configuration.

Vibrator coil operational frequency range: 38 to 600 Hz.

9.) Absolute maximum tool sustaining voltage: 1.8 $KV_{p-p}$

System Level Operational Description

Figure 5:
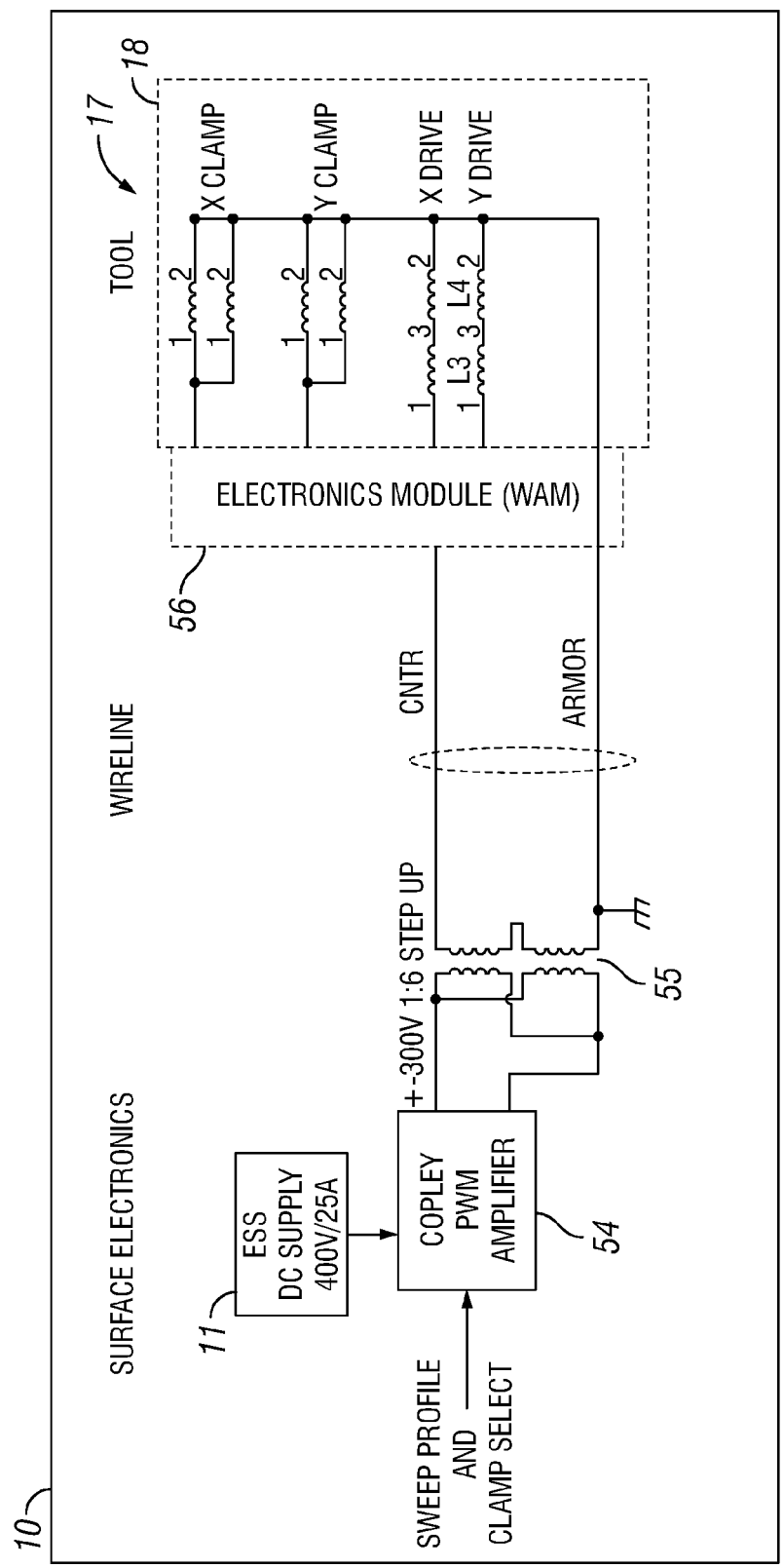
FIG. 5 is a schematic circuit diagram of an embodiment of the seismic generation system of FIG. 1.

FIG. 5 shows the major components for Z-Trac electrodynamic vibrator operation over monoconductor wireline. Located on the surface, is a 400 volt DC power supply 11, which provides raw power to a pulse width modulated (PWM) amplifier 54. Under computer control, the PWM power amplifier generates a composite waveform having peak amplitude of up to 300 volts. This voltage is further increased by a factor of ~6 by a transformer 55, and subsequently delivered to the wireline adaptor module (WAM) 56 via the monoconductor wireline.

The composite waveform includes two parts, the linear sum of 1.) the vibratory sweep sinusoidal waveform of tapered magnitude ranging from 38 to 600 Hz, and 2.) an out-of-band (non-vibrator) power/control signal of approximately 3 KHz. The function of the WAM is to separate the sweep signal from the ~3 KHz power/control signal. The sweep signal is directed to the vibrator coils, and the ~3 KHz power/control signal is used to 1.) Provide power to the WAM electronics, 2.) Select x or y-axis operation, and 3.) Deliver power to the x or y-axis vibrator electromagnetic clamp coils.

Wireline Adaptor Module Operation

Figure 6:
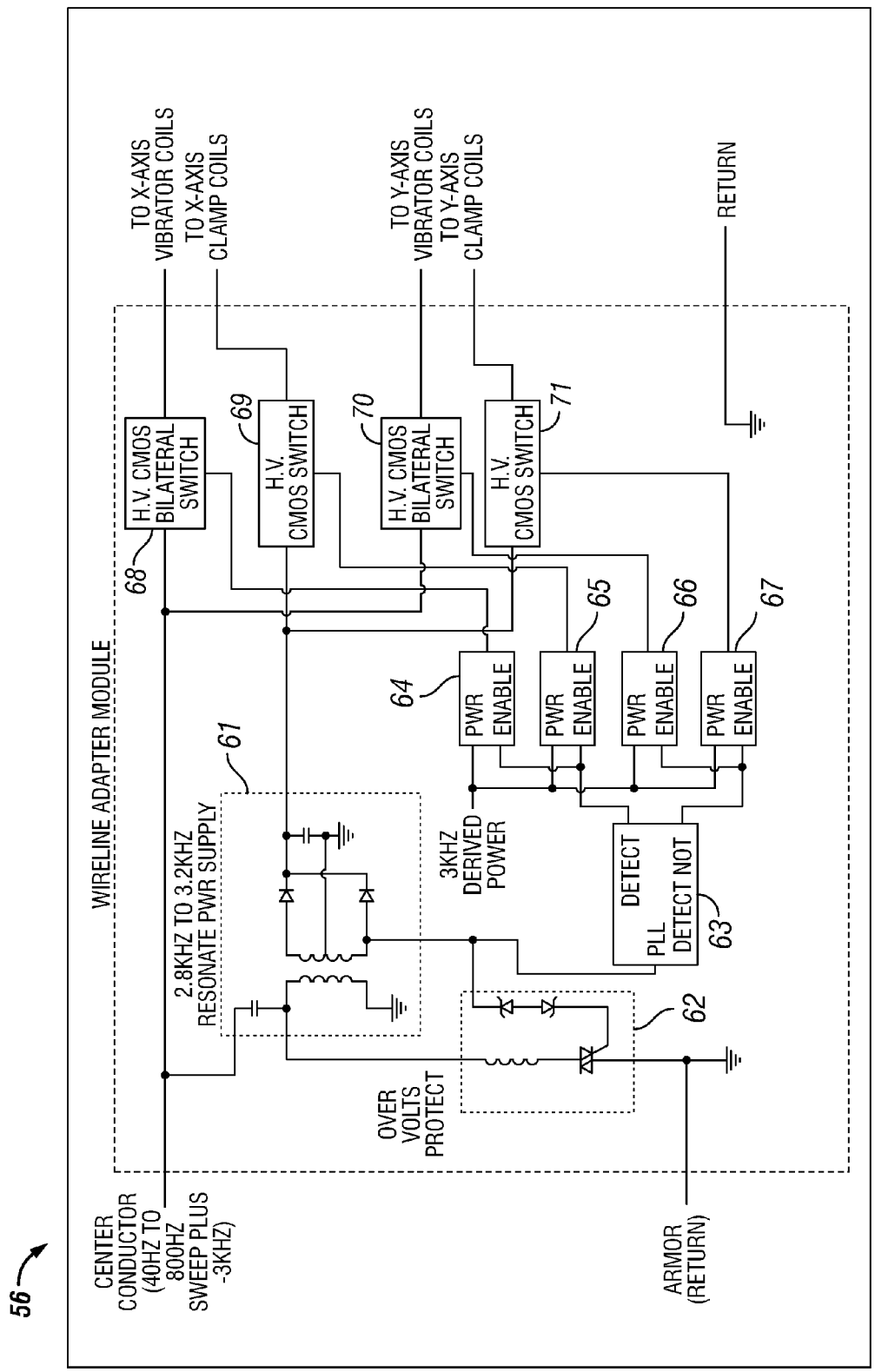
FIG. 6 is a schematic circuit diagram of the wireline adapter module from the seismic generation system of FIG. 5.

The major functional blocks of the WAM are indicated in FIG. 6. The composite signal is received on the wireline center conductor and presented to a resonant tank circuit 61. The tank resonance is located at approximately 3 KHz and forms a high pass filter with peaking which rejects the vibrator sweep signal and appears as a low impedance to the ~3 KHz power/control signals.

The ~3 KHz power/control signal is composed of one of two frequencies, a low tone at 2.9 KHz, or a high tone at 3.1 KHz. Performing as a band pass filter, the resonant tank circuit aids in discriminating these tones which, in a small signal sense, are passed on to a Phase Locked Loop (PLL) detector 63. A PLL lock signal is generated in the presence of the higher frequency tone, which results in turning off pass elements associated with the x-axis, and activating the y-axis. The output of the resonant tank circuit is also rectified and used to 1.) Power up the control section of the WAM, and 2.) To provide DC power to the vibrator clamp coils.

The lower frequencies in the range 38 Hz to 600 Hz, corresponding to the vibrator sweep, are delivered to the Z-Trac vibrator coils via the floating gate bi-lateral MOSFET switches 68-71. Floating gate drive 64-67 is derived via a transformer coupled isolation circuit. An over voltage protection circuit 62 shunts current away from (and de-tunes) the resonant node if the secondary of the resonant circuit exceeds threshold voltage values. Overvoltage conditions may occur when the tank circuit is inadvertently unloaded by the removal of a clamp load.

Z-Trac Vibrator Module Configuration

Figure 7:
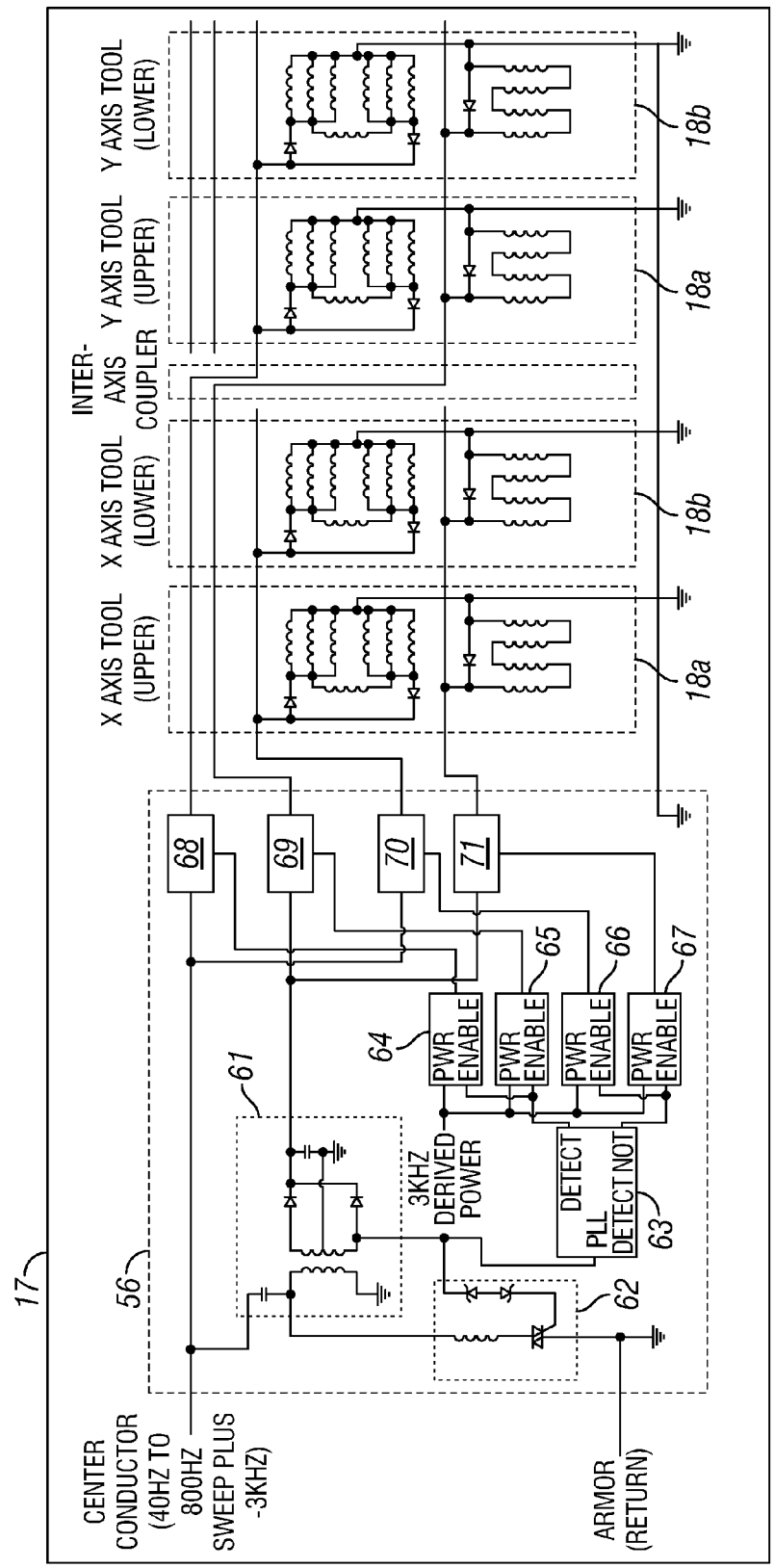
FIG. 7 is a schematic circuit diagram of the wireline adapter module and source elements from the seismic generation system of FIG. 5.

FIG. 7 shows the wiring of the Z-Trac modules for compatibility with the WAM. The clamp coils are placed in parallel, which is in contrast to series operation when using 7-conductor wireline. Configuration is accomplished with inter-axis couplers/adaptors.

Spice Modeling

Figure 8:
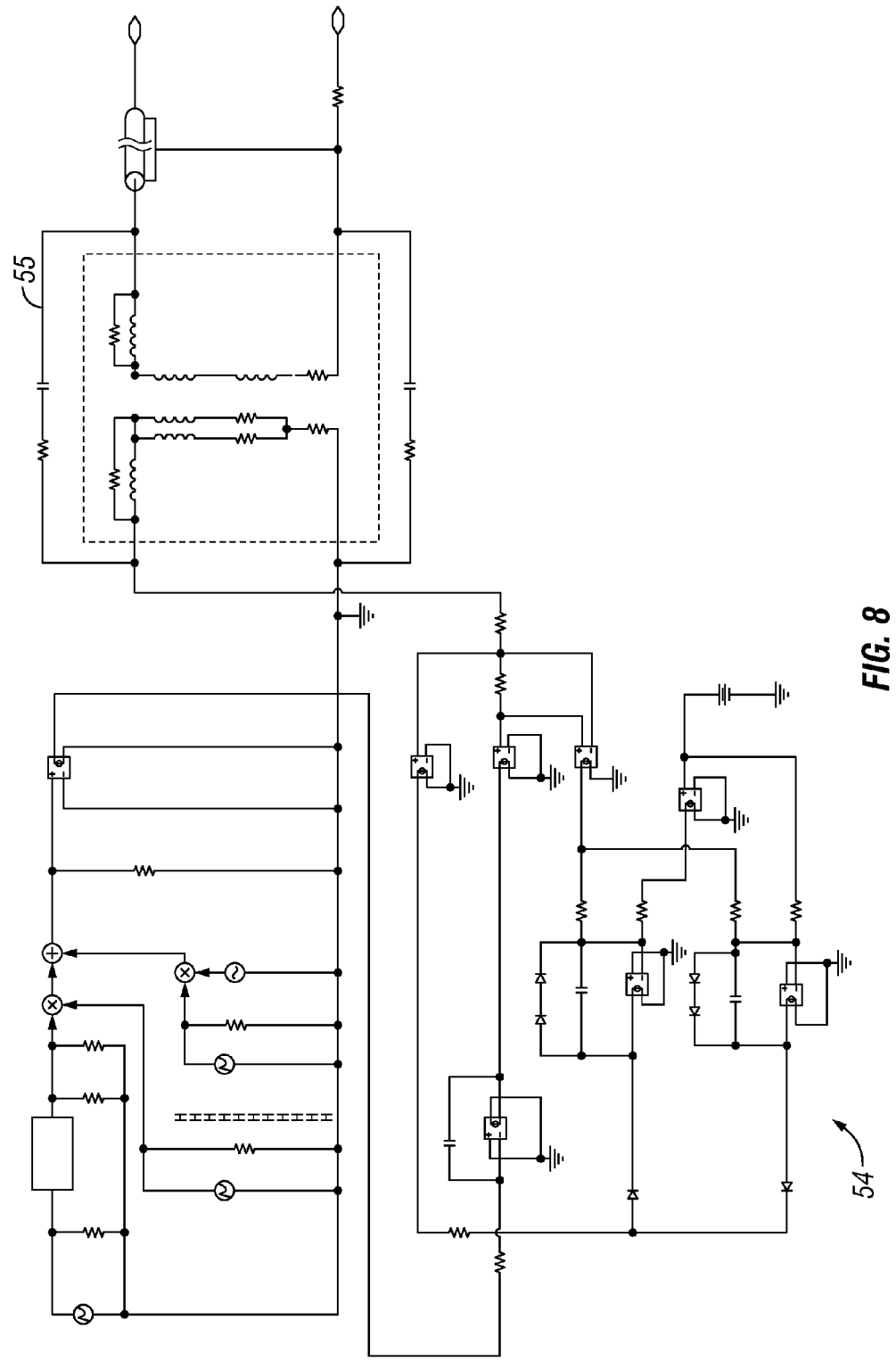
FIG. 8 is a schematic circuit diagram of an embodiment of the seismic generation system of FIG. 1.
Figure 9:
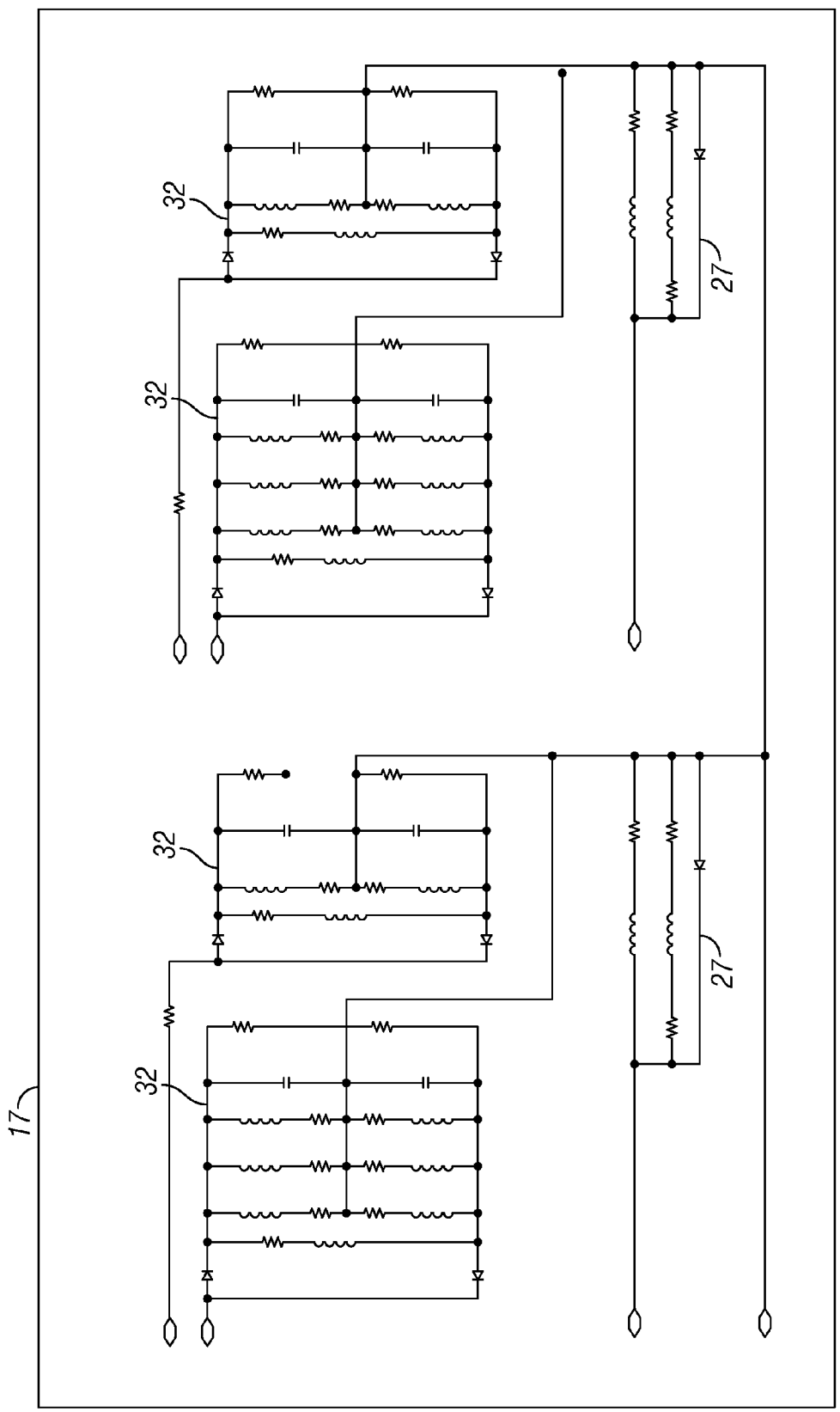
FIG. 9 is a schematic circuit diagram of the source elements from the seismic generation system of FIG. 5.

A comprehensive SPICE model for the Z-Track system operating over monoconductor wireline was evaluated. The Z-Track system operating over monoconductor wireline is presented in the following 2 schematics; Surface Electronics 54, and Z-Trac Vibrator Load (seismic generation source assembly 17) (FIGS. 8 and 9 respectively). The corresponding results and interpretation are given in FIGS. 10-13 (graphs 110,120, 130, & 140). The underlying model parameters were either obtained from manufacturer data, and/or confirmed by experimental results.

The Surface Electronics & Wireline Model (see FIG. 8) signal flow:

Composite Signal generation>Current limited power amplifier section>Step up transformer model>Wireline model The Wireline Adaptor Module signal flow: Resonant Tank Circuit Primary, Over-voltage Protection>Resonant Tank Section Secondary>Logic Power Supply & PLL, Vibrator Clamp Power Supply>Gate Drive non-isolated, Gate Drive Isolated>X & Y Clamp MOSFET switches HV Bi-Lateral MOSFET switches>

The Z-Trac Vibrator Load (see FIG. 9) signal flow: X & Y axis Clamp coils, X & Y axis vibrator coils with crossover inductor.

Spice Simulation Results

Figure 10:
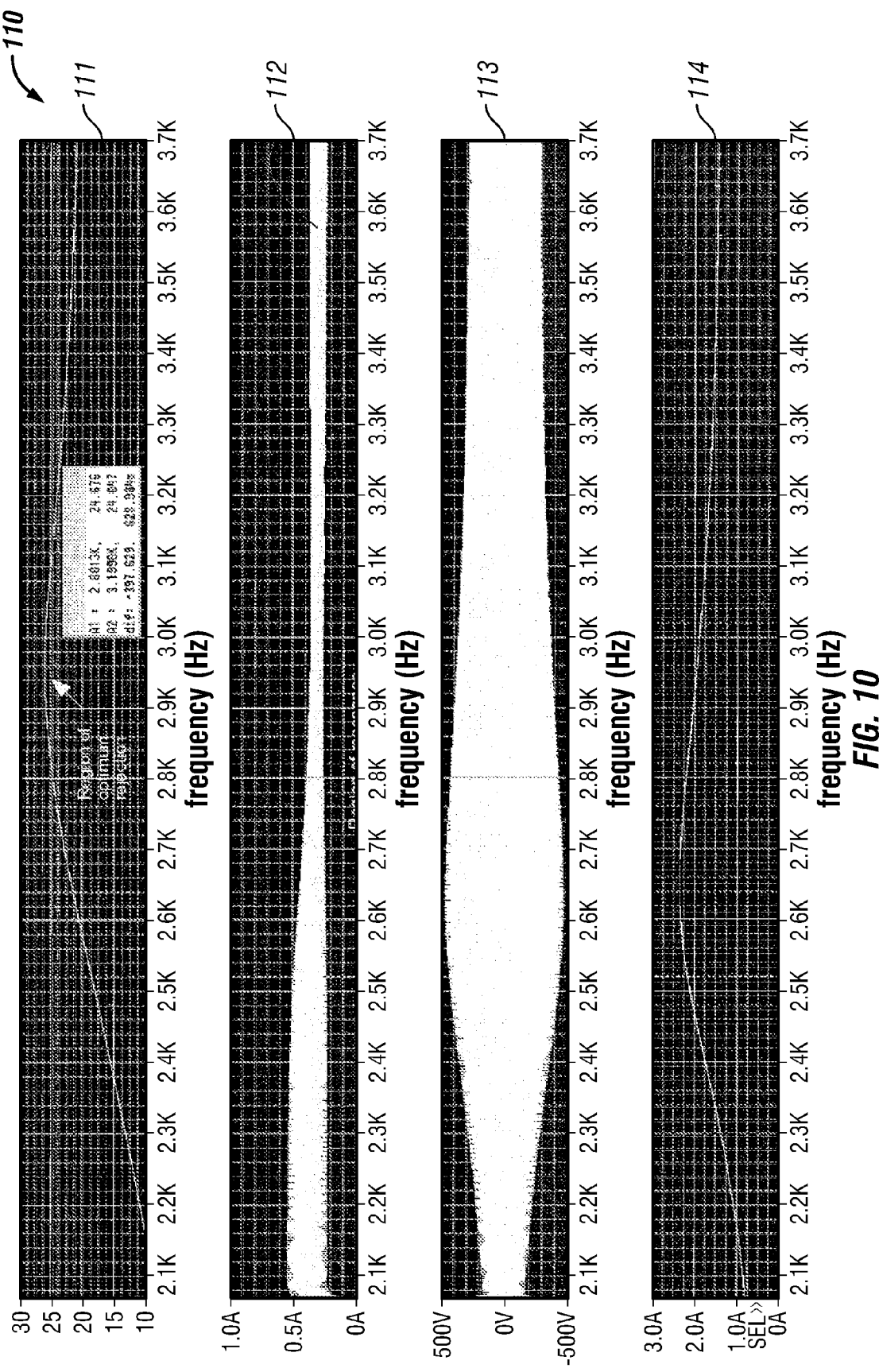
FIG. 10-13 are spice simulation diagrams from the seismic generation system of FIG. 5.

Resonant tank characteristics:

Simulation results indicated in FIG. 10 demonstrate the WAM resonant circuit performance over the narrow frequency range of 2.1 KHz to 3.7 KHz, which spans the range of the control frequencies (i.e.: not vibrator excitation). The magnitude of the forcing function (control signal) is held constant over the sweep, and arranged to yield a 2 amp clamp coil excitation at the resonant peak frequency. The upper trace 111 is the computed rejection ratio (in dB) of this control current in a single vibrator coil with respect to this forcing function. The second trace 112 is the (undesired) current (torque) exerted in a Z-Trac vibrator coil, and is minimized in the control-operating region. The third trace 113 is the primary transformer voltage. The fourth trace 114 indicates vibrator total DC clamp current.

Spice Simulation Results

Figure 11:
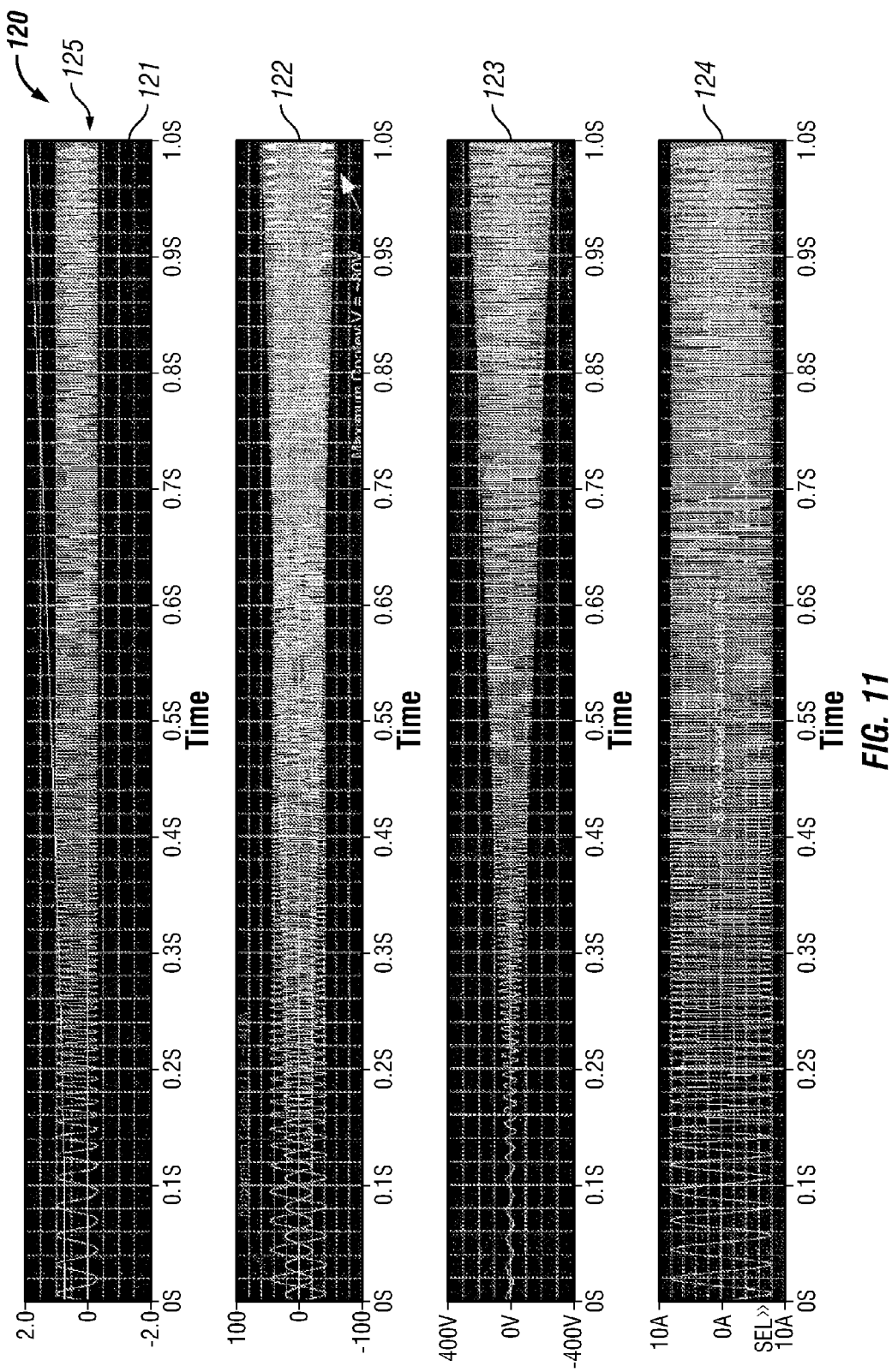

Vibrator sweep characteristics (no control/clamp excitation):

Simulation results indicated in FIG. 11 are due to a frequency sweep starting at 40 Hz and ending at 800 Hz and indicate system performance parameters (node voltages and currents). Top Trace 121: This is the current in an individual coil of a vibrator module. (There are 6 coils in each vibrator motor, 3 in parallel and are steered with a diode in a quasi push-pull fashion.) Observe the current peak of 1 amp per coil, which is the specified maximum use value. A negative going ~0.2 amps is due to energy stored in the "crossover inductor," which aids in sweeping out residual magnetism in the shaker vibrator coils assembly (so it does not stick to the armature bar).

Top Trace 125: This trace is the sweep envelope modifier which changes the amplitude of the surface voltage drive to compensate for increasing vibrator coil impedance as a function of frequency. Upper Middle Trace 122: This is the current in the primary windings of the surface transformer. Note that the current is at a maximum at lower frequencies. Upper Middle Trace 122: This is the voltage at the primary windings of the surface transformer. This voltage will increase with longer wire lengths due to wireline IR drop. Lower Middle Trace 123: This is the voltage at the WAM tank resonant input or vibrator coil input. This voltage is not a function of wireline length, but a function of vibrator coil impedance. Bottom Trace 124: This is the total vibrator coil excitation current for two Z-Trac modules operated in parallel (one axis). This is equivalent to wireline current.

Spice Simulation Results

Figure 12:
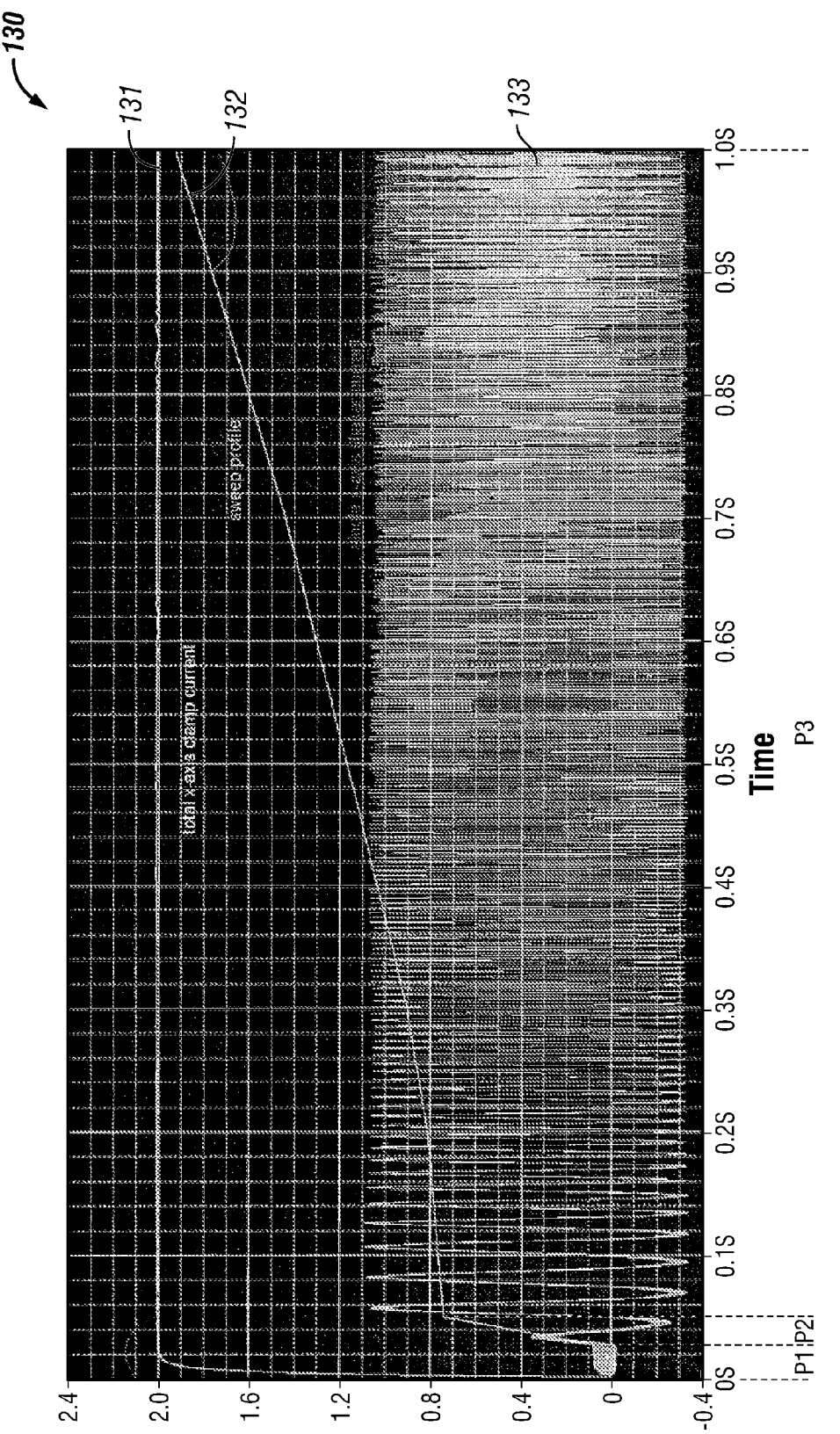

Vibrator sweep startup characteristics (sweep and clamp control):

FIG. 12 demonstrates startup sequence of the Z-Track tool when using the WAM. Trace 133: Is the composite waveform formed the linear addition of the vibrator sweep frequency and the ~3 KHz clamp/WAM power/control frequency. Trace 132: Is the vibrator sweep envelope modifier previously discussed. Trace 131: This is the Z-Track module total clamp current.

During period P1, the surface amplifier waveform includes the ~3 KHz waveform which powers-up the WAM. Depending on the frequency of this control signal either the x or y axis of Z-Trac operation is selected. At time P2 the magnitude of the sweep frequency is ramped up to a beginning value. At the end of period P2 the sweep is advanced from 40 Hz to 800 Hz corresponding to the end of the vibrator sweep and its magnitude modified by the sweep envelope modifier "sweep profile" resulting in constant current drive to the vibrator coils. Note: In some embodiments, ramp up, and ramp down, of waveforms are performed to reduce voltage overshoot.

Spice Simulation Results

Figure 13:
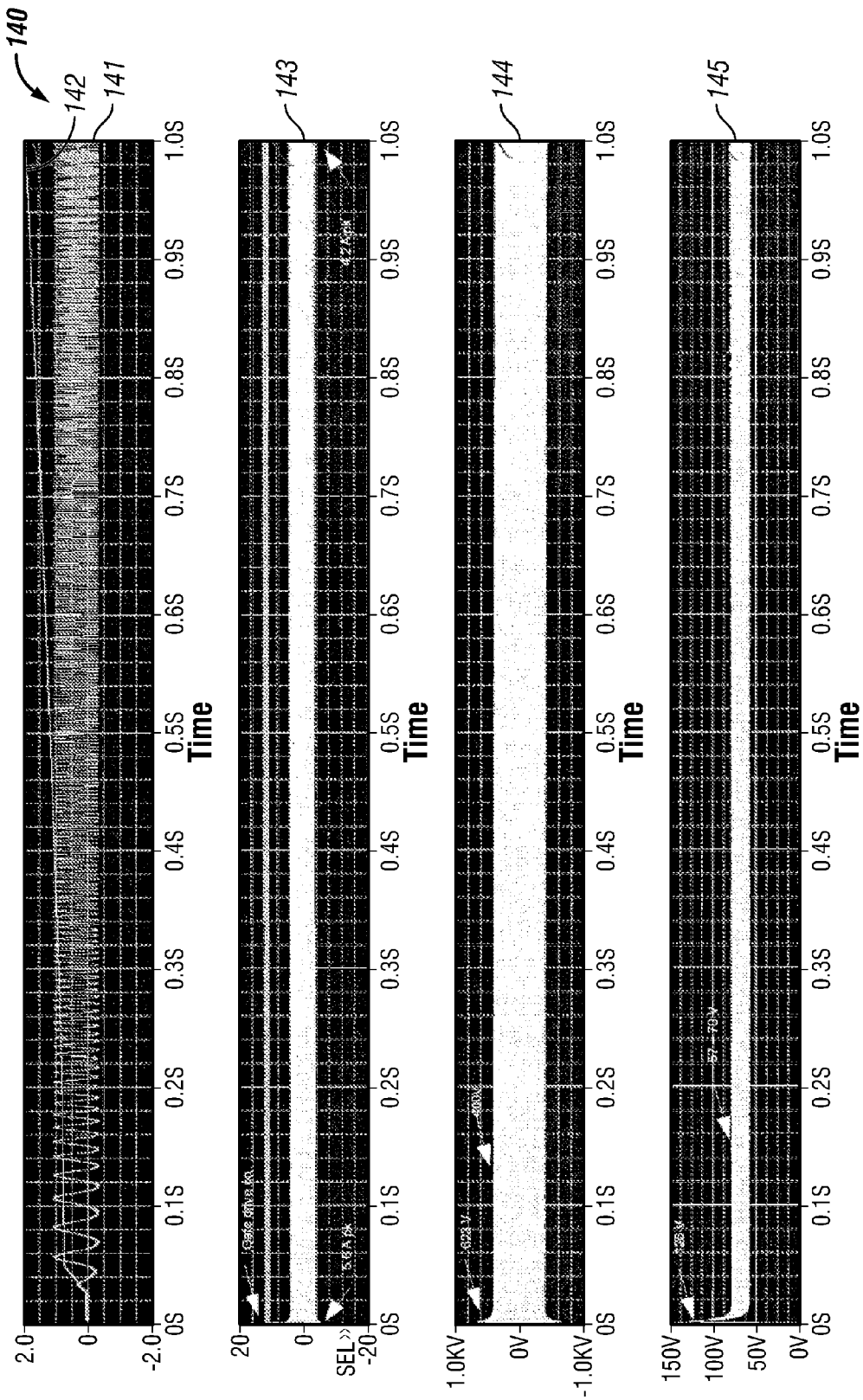

Vibrator sweep (sweep and clamp control): Combined Z-Trac vibrator and clamp coil operation is shown in FIG. 13. Top Trace 142: This is the ramped up and envelope modified vibrator coil current. This is the current in a single coil of a 3 coil pair as previously discussed. Top Trace 141: Vibrator envelope modifier. Upper Middle Trace 143: This is the resonant transformer primary current. Nominal value is 4.2 A peak. The 5.2 Apk has been subsequently reduced by ramping up the control waveform in 45 cycles. Upper Middle Trace 143: This is the floating gate drive voltage, which controls the bi-lateral MOSFET switches. This is a result of the ~3 KHz waveform passing though a high voltage isolation transformer and subsequently rectified.

Lower Middle Trace 144: This is the nominally 400 Vpk WAM resonant transformer primary voltage. Ramping up the control waveform, previously discussed, has reduced the 623 Vpk overshoot. Lower 145: This is the rectified output voltage (with ripple) of the WAM power resonant circuit. The Nominal voltage is roughly 65 volts depending on clamp coil current drive value and coil impedance. The clamp coil itself integrates the ripple. Again, ramping up the control waveform has reduced the startup overshoot.

Projected Wireline Operational Length $$L_{max} \cong V_{surfmax} - (V_{tool} + I_{tool}(R_{wireline})) = 25{,}203 \text{ feet}$$

where:

$L_{max}$=wire line length in feet $V_{surfmax}$=1200 $V_{pk}$ (surface transformer isolation breakdown)

$V_{tool}$=633 $V_{pk}$ (max Voltage at WAM to for 600 Hz vibrator & clamp operation)

Itool=8 $A_{pk}$ (Current in wireline for 600 Hz vibrator & clamp operation)

$R_{wireline}$=0.043 Ω/foot round trip (for Camesa ⅜" monoconductor 1N38)

Design Feature—Maximum Operating Temperature

The operational target temperature is 200° C. This restricts circuit topology, complexity, and part availability. Therefore, the design methodology is to select those component technologies, which are both readily available and exhibit manufactures data favorable to operation at elevated temperature.

Design Feature—Resonant Tank Circuit

It is desired to have some kind of circuit, which is 1.) frequency selective, 2.) minimizes the used voltage at its input terminals, and 3.) delivers power to its load (the clamp coils). Frequency selectivity implies orthogonal operation with respect to the vibrator sweep. Minimizing the input voltage leads to reduced composite drive amplitude, thereby leaving more headroom vibrator excitation. A resonant tank circuit is designed, which satisfies these requirements. The resonant tank is composed of the transformer T1, capacitor bank (C1-C22), the load placed on the secondary T1 (rectifier, caps, clamp coils), and the driving point impedance.

Figure 14:
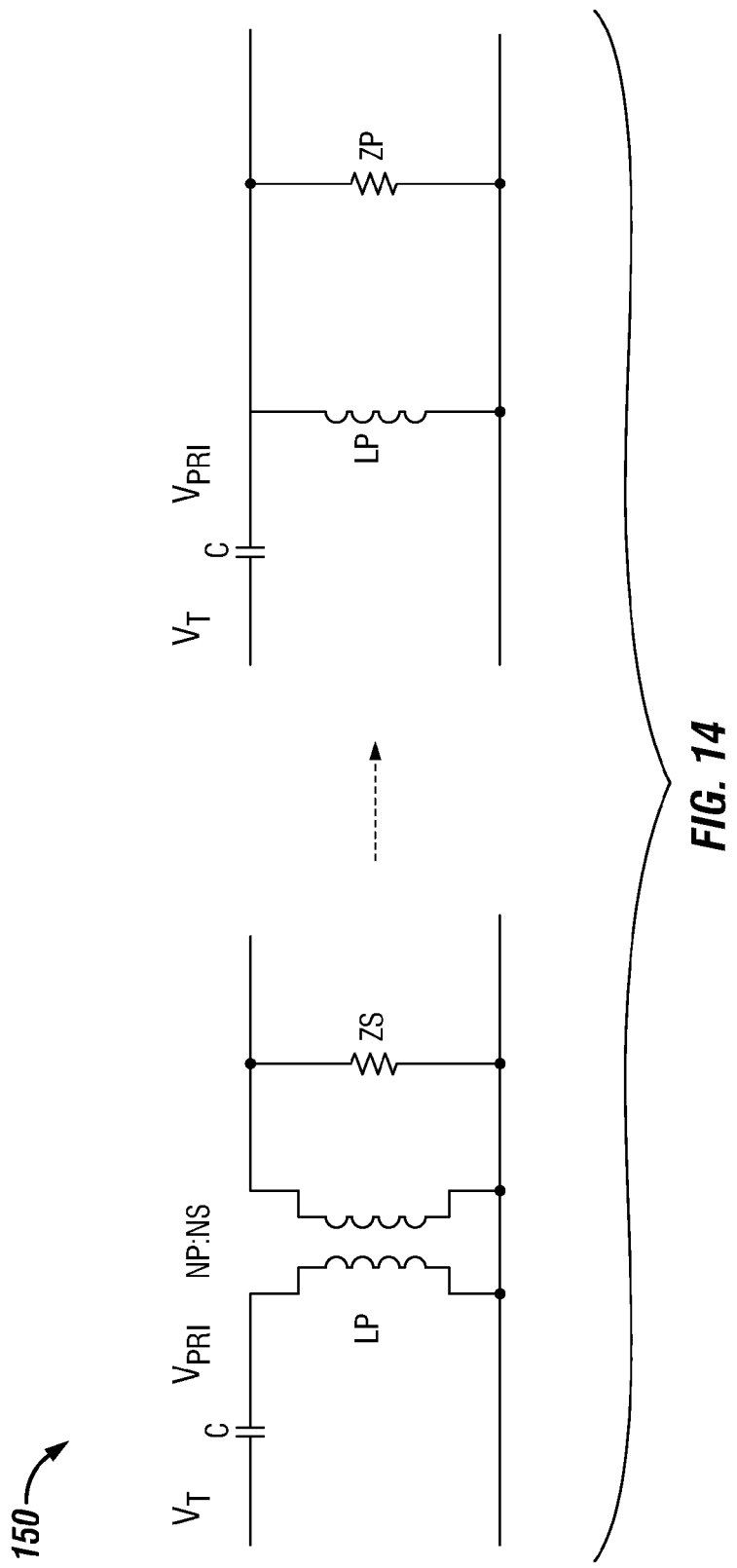
FIG. 14 is a schematic circuit diagram of the seismic generation system of FIG. 5.

In order to determine component element values and inspect parameter trade-offs, it is valuable to have a rudimentary set of expressions which relate design parameters. A circuit approximation 150 is developed in order to make the analysis tractable. In FIG. 14, the circuit elements T1, the capacitor bank (C1-C22), and secondary load are represented as C, a transformer (inductance Lp & turns ratio Np:Ns), and secondary impedance Zs respectively.

Sets of equations are now presented which reflect this circuit model.

The transfer function from the wireline entry point $V_t$ to the resonant node $V_{pri}$ is given by:

$$\frac{V_{pri}(s)}{V_t(s)} = \frac{s^2}{s^2 + s\frac{1}{Z_{pri}C} + \frac{1}{LC}}$$

where:

C=tank capacitance

L=tank primary inductance $Z_{pri}$=equivalent secondary loading at transformer primary Which is as second order system in the form of:

$$H(s) = \frac{s^2}{s^2 + s2\varsigma\omega_0 + \omega_0^2}$$

where:

$$\omega_0 = \frac{1}{\sqrt{LC}} = \text{natural frequency} \qquad \text{Eq. 1}$$

$$\varsigma = \frac{1}{2Z_{pri}}\sqrt{\frac{L}{C}} = \text{damping factor} \qquad \text{Eq. 2}$$

The magnitude of the transfer function is:

$$|H(s)|_{s=j\omega} =$$

$$\left|\frac{-\omega^2}{-\omega^2 + j\omega 2\varsigma\omega_0 + \omega_0^2}\right| = \frac{1}{\sqrt{\left[1-\left(\frac{\omega_0}{\omega}\right)^2\right]^2 + \left[2\varsigma\frac{\omega_0}{\omega}\right]^2}} = \frac{1}{\sqrt{G(\omega)}}$$

let $\left(\frac{\omega_0}{\omega}\right)^2 = u$ then: $G(\omega) = (1-u)^2 + 4\varsigma^2 u = u^2 + (4\varsigma^2 - 2) + 1$ The frequency where $|H(\omega)|$ is maximized can be found by minimizing $G(\omega)$:

$$\frac{dG(\omega)}{du} = 2u + 4\varsigma^2 - 2 = 0 \qquad \text{Eq. 3}$$

$$u = \left(\frac{\omega_0}{\omega}\right)^2 = 1 - 2\varsigma^2$$

$$\therefore \omega_{max} = \frac{\omega_0}{\sqrt{1-2\varsigma^2}}; \omega_0 < \omega_{max}$$

By substitution, the magnitude of the transfer function at $\omega_{max}$ is given by:

$$|H(\omega_{max})| = \frac{1}{2\varsigma\sqrt{1-\varsigma^2}} \qquad \text{Eq. 4}$$

The equivalent load reflected from the transformer secondary back to the transformer primary is:

$$Z_{pri}(s) = \frac{Z_{sec}(s)}{\left(\frac{N_{sec}}{N_{pri}}\right)^2} = \left(\frac{N_{pri}}{N_{sec}}\right)^2 (R_{clamp} + sL_{clamp})$$

where:

$N_{pri}$=number primary turns $N$ sec=number secondary turns $R_{clamp}$=real part of clamp coil resistance $R_{clamp}$=clamp coil inductance $\omega \rightarrow 0$ since the secondary output is rectified & ripple is assumed small.

$$\therefore |Z_{pri}| \cong \left(\frac{N_{pri}}{N_{sec}}\right)^2 R_{clamp}$$

Interpretation of Circuit Equations
Equation 1

$$\left[\omega_0 = \frac{1}{\sqrt{LC}}\right]$$

gives the natural frequency of the resonant circuit. Degrees of freedom are L and C. To a large extent this will determine the operating frequency.

Equation 2

$$\left[\varsigma = \frac{1}{2Z_{pri}}\sqrt{\frac{L}{C}}\right]$$

indicates that the damping factor is a function of both the L/C ratio and the load reflected to the primary. Degrees of freedom are L and C bounded by the operating frequency and the load impedance reflected to the primary. Making the damping factor too small will pace a large amount of voltage on the resonant tank capacitors. It may also increase the flux density in the transformer.

Equation 3

$$\left[\omega_{max} = \frac{\omega_0}{\sqrt{1-2\varsigma^2}}; \omega_0 < \omega_{max}\right]$$

shows that the peak operating frequency (for zero source impedance) may be greater than the natural frequency and is mildly dependent on the damping factor for small ζ.

Equation 4

$$\left[|H(\omega_{max})| = \frac{1}{2\varsigma\sqrt{1-\varsigma^2}}\right]$$

gives the magnitude of the resonant peak as a function of the damping factor. Less damping→more peaking.

Equation 5

$$\left[Z_{pri}(s) == \left(\frac{N_{pri}}{N_{sec}}\right)^2 R_{clamp}\right]$$

relates tank loading. The degree of freedom is the turns ratio. Increasing the turns ratio (of the step-down transformer), reduces the load on the resonant tank thereby effecting the damping factor.

Circuit Embodiment

Using element values from the actual physical design, the circuit model predicts the following:

ElementValues:

$L=6.08\times10^{-3}$ Henries $C \approx 0.46\times10^{-6}$ Farads $R_{clamp}=35\Omega$ $$\frac{N_{sec}}{N_{pri}} = \frac{1}{5} \text{ turns}$$

From Eq 1:

$$\omega_0 = \frac{1}{\sqrt{LC}} = \frac{1}{\sqrt{(6.08 \times 10^{-3})(0.46 \times 10^{-6})}} = 18.91 \times 10^3 \text{ rad/sec or 3.0009 KHz}$$

From Eq 5:

$$|Z_{pri}| \cong \left(\frac{N_{pri}}{N_{sec}}\right)^2 R_{clamp} = (25)(35\Omega) = 875\Omega$$

From Eq 2:

$$\varsigma = \frac{1}{2Z_{pri}}\sqrt{\frac{L}{C}} = \frac{1}{1.75 \times 10^3}\sqrt{\frac{6.08 \times 10^{-3}}{0.46 \times 10^{-6}}} = \frac{115}{1.75 \times 10^3} = 0.066$$

From Eq 3:

$$\omega_{max} = \frac{\omega_0}{\sqrt{1-2\varsigma^2}} = \frac{\omega_0}{\sqrt{1-2(0.066)^2}} = 1.004\omega_o \rightarrow 3.021 \text{ KHz}$$

From Eq 4:

$$|H(\omega_{max})| = \frac{1}{2\varsigma\sqrt{1-\varsigma^2}} = \frac{1}{2(0.066)\sqrt{1-(0.066)^2}} = 7.592 \text{ (or 17.61 dB)}$$

Discussion

Using the physical design parameters above, and a 2.0 amp clamp coil current implies Vpri=400 Vpk. This is consistent with measured prototype results. However, Equation 4 predicts that the driving point voltage will be $$\frac{400\ V_{pk}}{7.592} = 52.3\ V_{pk}$$

and prototype results are much larger.

Figure 15:
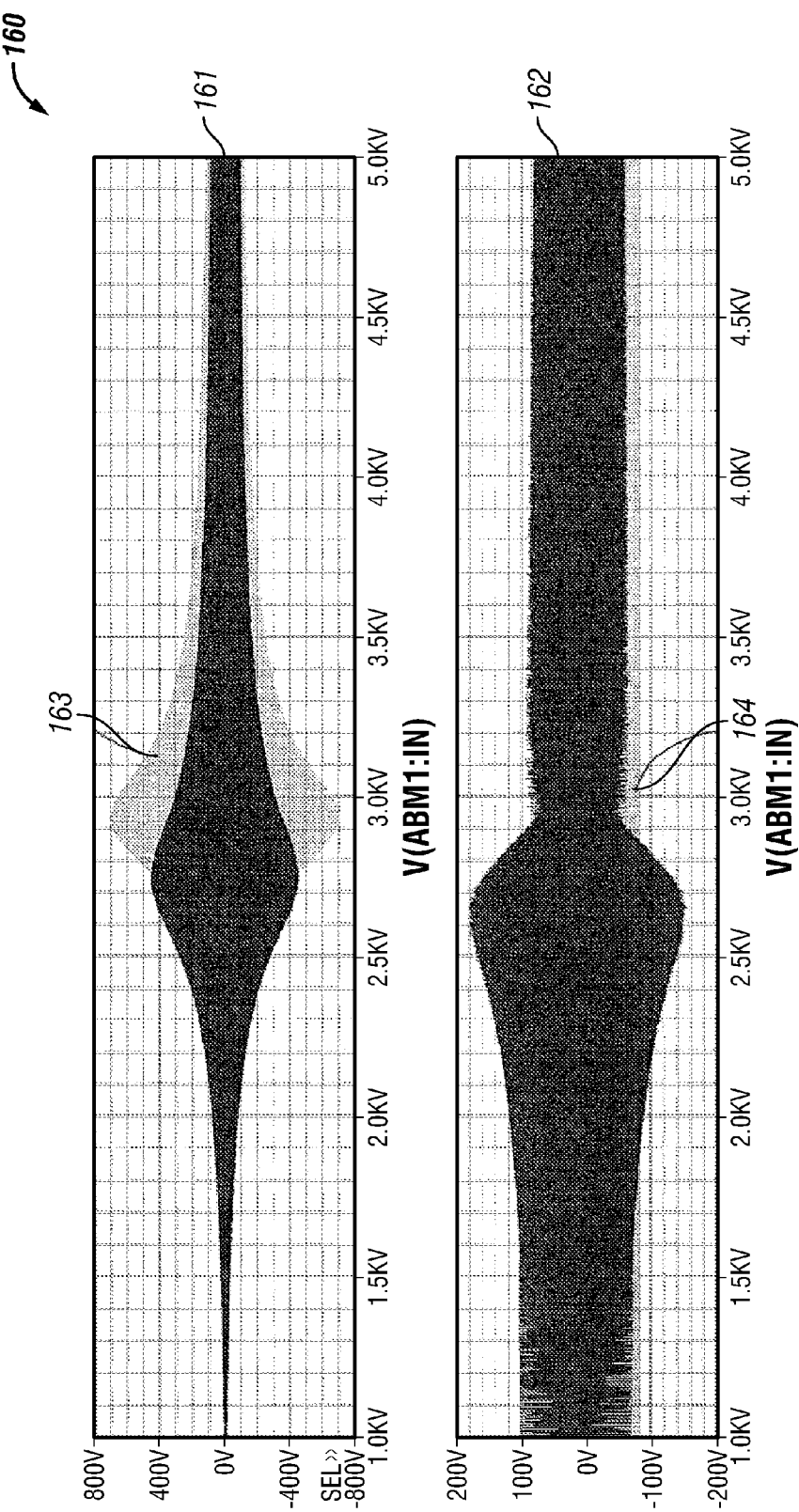
FIG. 15 is another spice simulation diagram from the seismic generation system of FIG. 5.

Further investigation reveals that the surface transformer parasitic inductance (not the wireline) affects resonant characteristics dramatically since the driving point impedance is complex and non-zero. FIG. 15 shows a SPICE simulation 160 which reveals that the voltage at Vt increases with surface transformer drive in contrast to an ideal voltage source.

Trace 163: driven by ideal voltage source
Trace 164: directly driven by surface transformer
Lower trace: Voltage at Vt: 162
Upper trace: Voltage at Vpri 161

Design Embodiment

1.) Over voltage protection circuitry—inductor resolution: The commercially available inductors (L1_mod1–L4_mod1) utilized for prototype evaluation are not intended for elevated temperature operation. A high temperature custom inductor(s) using core material (similar to that selected for T1, T2, and T3) should be incorporated in the design. This includes a method to mount both the cores and discrete components.

2.) Temperature Testing: Prototype evaluation at elevated temperatures has not been performed. This may expose design issues, which would impact component selection, or design topology.

3.) Under Voltage Lockout: The present design does not prevent the MOSFET gates from entering the linear region of operation when the magnitude of the ~3 KHz control/power signal is too small. On startup, a controlled ramp (45 cycles of the ~3 KHz control/power signal, having a final value resulting in not less than 0.6 amps through clamp coil circuit) is presently used to mitigate this problem. It is suggested that control circuitry are added to the WAM which would holds the gate signals low until sufficient drive voltage is available to saturate the MOSFETs.

4.) Surface amplifier current limiting: At present, current clamping is effected by limiting the current entering the Copley PWM amplifier from the raw DC supply. Periodic, and voltage transients, are observed at the WAM input when this clamp mechanism is activated. Incorporating a current limit mechanism, which is faster acting, and removes WAM excitation in a controlled ramp-down is recommended.

5.) Driving point impedance: The Instrument Inc surface transformer effects resonant tank performance. Further investigation in this area is recommended.

6.) Composite waveform generation: At present, due to hardware/software limitations, there is no mechanism to taper the magnitude of the computer generated clamp waveform as a function of increasing vibrator drive frequency. Implementing this taper mechanism would optimize WAM drive headroom.

Many modifications and other embodiments will come to the mind of one skilled in the art having the benefit of the teachings presented in the foregoing descriptions and the associated drawings. Therefore, it is understood that various modifications and embodiments are intended to be included within the scope of the appended claims.

That which is claimed is:

1. A seismic generation system comprising:
    an electrical source;
    at least one conductor coupled to said electrical source and to be positioned in a wellbore in a subterranean formation with a casing therein; and
    a seismic generation source assembly to be positioned in the wellbore and coupled to said at least one conductor, said seismic generation source assembly comprising at least one source element comprising
        a sealed housing,
        an armature within said sealed housing,
        a plurality of source electromagnets coupled to said armature, and
        a plurality of electromagnetic clamps coupled to said armature, each electromagnetic clamp having opposite magnetic poles,
        said sealed housing comprising respective ferromagnetic portions adjacent the opposite magnetic poles of each electromagnetic clamp, and non-ferromagnetic portions between the opposite magnetic poles of each electromagnetic clamp.

2. The seismic generation system of claim 1 wherein each non-ferromagnetic portion comprises a non-ferromagnetic insert between the opposite magnetic poles of each electromagnetic clamp.

3. The seismic generation system of claim 1 wherein each ferromagnetic portion comprises a ferromagnetic patch portion.

4. The seismic generation system of claim 1 wherein said seismic generation source assembly comprises a swiveling coupler between said at least one source element and said at least one conductor.

5. The seismic generation system of claim 1 wherein said seismic generation source assembly comprises a gyroscope to provide positional data of said at least one source element.

6. The seismic generation system of claim 1 wherein said at least one conductor comprises a single conductor; and wherein said at least one source element comprises a controller coupled to said single conductor to selectively operate said pluralities of electromagnetic clamps, and source electromagnets.

7. The seismic generation system of claim 1 further comprising a receiver assembly to be positioned in another wellbore for receiving at least one seismic wave from said seismic generation source assembly.

8. The seismic generation system of claim 1 wherein said at least one source element comprises a plurality thereof spaced apart longitudinally in the wellbore.

9. The seismic generation system of claim 1 wherein said sealed housing comprises a cylindrical housing.

10. A seismic generation system comprising:
an electrical source;
at least one conductor coupled to said electrical source and to be positioned in a wellbore in a subterranean formation with a casing therein; and
a seismic generation source assembly to be positioned in the wellbore and coupled to said at least one conductor, said seismic generation source assembly comprising at least one source element, and a swiveling coupler between said at least one source element and said at least one conductor, said at least one source element comprising
a cylindrical sealed housing,
an armature within said cylindrical sealed housing,
a plurality of source electromagnets coupled to said armature, and
a plurality of electromagnetic clamps coupled to said armature, each electromagnetic clamp having opposite magnetic poles,
said cylindrical sealed housing comprising respective ferromagnetic portions adjacent the opposite magnetic poles of each electromagnetic clamp, and non-ferromagnetic portions between the opposite magnetic poles of each electromagnetic clamp.

11. The seismic generation system of claim 10 wherein each non-ferromagnetic portion comprises a non-ferromagnetic insert between the opposite magnetic poles of each electromagnetic clamp.

12. The seismic generation system of claim 10 wherein each ferromagnetic portion comprises a ferromagnetic patch portion.

13. The seismic generation system of claim 10 wherein said seismic generation source assembly comprises a gyroscope to provide positional data of said at least one source element.

14. The seismic generation system of claim 10 wherein said at least one conductor comprises a single conductor; and wherein said at least one source element comprises a controller coupled to said single conductor to selectively operate said pluralities of electromagnetic clamps, and source electromagnets.

15. The seismic generation system of claim 10 further comprising a receiver assembly to be positioned in another wellbore for receiving at least one seismic wave from said seismic generation source assembly.

16. The seismic generation system of claim 10 wherein said at least one source element comprises a plurality thereof spaced apart longitudinally in the wellbore.

17. A seismic generation source assembly comprising:
at least one source element comprising
a sealed housing,
an armature within said sealed housing,
a plurality of source electromagnets coupled to said armature, and
a plurality of electromagnetic clamps coupled to said armature, each electromagnetic clamp having opposite magnetic poles,
said sealed housing comprising respective ferromagnetic portions adjacent the opposite magnetic poles of each electromagnetic clamp, and non-ferromagnetic portions between the opposite magnetic poles of each electromagnetic clamp.

18. The seismic generation source assembly of claim 17 wherein each non-ferromagnetic portion comprises a non-ferromagnetic insert between the opposite magnetic poles of each electromagnetic clamp.

19. The seismic generation source assembly of claim 17 wherein each ferromagnetic portions comprises a ferromagnetic patch portion.

20. The seismic generation source assembly of claim 17 wherein said at least one source element comprises a plurality thereof spaced apart longitudinally in a subterranean formation.

21. The seismic generation source assembly of claim 17 wherein said seismic generation source assembly comprises a swiveling coupler between said at least one source element and said at least one conductor.

22. The seismic generation source assembly of claim 17 wherein said seismic generation source assembly comprises a gyroscope to provide positional data of said at least one source element.

23. The seismic generation source assembly of claim 17 wherein said at least one conductor comprises a single conductor; and wherein said at least one source element comprises a controller coupled to said single conductor to selectively operate said pluralities of electromagnetic clamps, and source electromagnets.

24. A method for operating a seismic generation system in a wellbore in a subterranean formation with a casing therein, the method comprising:
coupling at least one conductor to an electrical source;
positioning in the wellbore a seismic generation source assembly comprising at least one source element comprising
a sealed housing,
an armature within the sealed housing,
a plurality of source electromagnets coupled to the armature, and
a plurality of electromagnetic clamps coupled to the armature, each electromagnetic clamp having opposite magnetic poles,
the sealed housing comprising respective ferromagnetic portions adjacent the opposite magnetic poles of each electromagnetic clamp, and non-ferromagnetic portions between the opposite magnetic poles of each electromagnetic clamp; and
activating at least one of the plurality of source electromagnets and the plurality of electromagnetic clamps.

25. The method of claim 24 wherein each non-ferromagnetic portion comprises a non-ferromagnetic insert between the opposite magnetic poles of each electromagnetic clamp.

26. The method of claim 24 wherein each ferromagnetic portion comprises a ferromagnetic patch portion.

27. The method of claim 24 further comprising maintaining static rotational position of the seismic generation source assembly with a swiveling coupler between the at least one source element and the at least one conductor.

28. The method of claim 24 further comprising generating positional data of the at least one source element with a gyroscope.

\* \* \* \* \*